United States Patent
Tabata et al.

[19]

[11] Patent Number: 6,076,414
[45] Date of Patent: *Jun. 20, 2000

[54] SHIFT RANGE CONTROL SYSTEM FOR AUTOMATIC TRANSMISSIONS

[75] Inventors: Atsushi Tabata, Okazaki; Hideo Tomomatsu, Nagoya; Etsuo Shimizu, Toyota; Kenji Niwa, Kasugai; Haruyuki Kodera; Atsumu Otobe, both of Toyota, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,540

[22] Filed: Sep. 2, 1997

[30] Foreign Application Priority Data

Sep. 2, 1996 [JP] Japan ..................... 8-250922

[51] Int. Cl.[7] ..................................................... B60K 20/06
[52] U.S. Cl. .............................................................. 74/335
[58] Field of Search ................................. 74/335, 336 R; 477/142; 701/52

[56] References Cited

U.S. PATENT DOCUMENTS

| | | | |
|---|---|---|---|
| 3,650,161 | 3/1972 | Ito et al. .............................. | 74/335 X |
| 4,631,679 | 12/1986 | Klatt ...................................... | 701/52 |
| 4,905,530 | 3/1990 | Stehle et al. ........................... | 74/335 |
| 4,987,792 | 1/1991 | Mueller et al. ........................ | 74/335 X |
| 5,009,128 | 4/1991 | Seidel et al. .......................... | 74/335 X |
| 5,127,288 | 7/1992 | Hojo et al. ............................. | 74/335 |
| 5,197,344 | 3/1993 | Maier et al. ............................ | 74/335 |
| 5,233,525 | 8/1993 | Overmann et al. .................... | 701/52 |
| 5,351,570 | 10/1994 | Mizunuma et al. .................... | 74/335 |
| 5,415,056 | 5/1995 | Tabata et al. .......................... | 74/335 |
| 5,419,412 | 5/1995 | Schwab et al. ........................ | 74/335 X |
| 5,425,686 | 6/1995 | Grange .................................. | 74/335 X |
| 5,509,322 | 4/1996 | Anderson et al. ..................... | 74/335 |
| 5,592,851 | 1/1997 | Bates et al. ............................ | 74/336 R |
| 5,658,219 | 8/1997 | Kondo et al. .......................... | 477/142 X |
| 5,738,607 | 4/1998 | Kondo et al. .......................... | 477/142 X |
| 5,799,539 | 9/1998 | Haase ..................................... | 74/335 X |
| 5,823,052 | 10/1998 | Nobumoto .............................. | 74/335 |
| 5,865,705 | 2/1999 | Shamoto et al. ....................... | 74/335 X |

FOREIGN PATENT DOCUMENTS 5-196118  8/1993  Japan .

*Primary Examiner*—Dirk Wright
*Attorney, Agent, or Firm*—Oblon, Spivak, McClelland, Maier & Neustadt, P.C.

[57] ABSTRACT

A shift range control system for an automatic transmission, comprising: a first range switching mechanism for selecting a shift range mechanically; and a second range switching mechanism for outputting an electric signal, while a predetermined shift range is being selected by the first range switching mechanism, to switch the shift range electrically. Further comprised is a return switch mechanism for releasing the shift range, which is lower by two or more steps than the predetermined shift range selected by the first range switching mechanism, to switch the same to the predetermined shift range. Thus, it is possible to improve the conveniences for switching the shift range of the automatic transmission by the electric operation.

6 Claims, 13 Drawing Sheets

DOWN-RANGE FROM 5TH SPEED OF D-RANGE

DOWN-RANGE FROM 3TH SPEED OF D-RANGE

FIG.16

| | | C-0 | C-1 | C-2 | B-0 | B-1 | B-2 | B-3 | B-4 | F-0 | F-1 | F-2 |
|---|---|---|---|---|---|---|---|---|---|---|---|---|
| P | | | | | | | | | | | | |
| Rev | | | | ○ | ○ | | | | ○ | | | |
| N | | ○ | | | | | | | | | | |
| D | 1st | ○ | ○ | | | | | | | ○ | | ○ |
| | 2nd | | ○ | | | | | ○ | | ○ | | |
| | 3rd | ○ | ○ | | | | ○ | | | ○ | ○ | |
| | 4th | ○ | ○ | ○ | | | ◎ | | | ○ | | |
| | 5th | | ○ | ○ | ○ | | ◎ | | | | | |
| 4 | 1st | ○ | ○ | | | | | | | ○ | | ○ |
| | 2nd | | ○ | | | | | ○ | | ○ | | |
| | 3rd | ○ | ○ | | | | ○ | | | ○ | ○ | |
| | 4th | ○ | ○ | ○ | | | ◎ | | | ○ | | |
| 3 | 1st | ○ | ○ | | | | | | | ○ | | ○ |
| | 2nd | | ○ | | | | | ○ | | ○ | | |
| | 3rd | ○ | ○ | | | ● | ○ | | | ○ | ○ | |
| 2 | 1st | ○ | ○ | | | | | | | ○ | | ○ |
| | 2nd | ● | ○ | | | | | ○ | | ○ | | |
| L | 1st | ○ | ○ | | | | | | ● | ○ | | ○ | ofShIFT RANGE CONTROL SYSTEM FOR
SHIFT RANGE CONTROL SYSTEM FOR AUTOMATIC TRANSMISSIONS

BACKGROUND OF THE INVENTION

1. Field of the Invention

The present invention relates to a shift range control system enabled to switch the running ranges of an automatic transmission for a vehicle by an electric operation.

2. Related Art

One example of the system of this kind is disclosed in Japanese Patent Laid-Open No. 196118/1993 (JPA 5-196118). The system, as disclosed, is equipped with: a first range switching mechanism for mechanically selecting the individual shift ranges including parking, reverse, neutral and drive ranges; and a second range switching mechanism for selecting a plurality of lower-speed shift ranges by outputting an electric signal while the drive range is being selected by the first range switching mechanism. More specifically, this shift apparatus is equipped with up- and down-switches so that the shift ranges may be switched step by step to higher- or lower-speed sides each time the switches are operated in the drive range.

According to the range switching system of this kind, therefore, the switching of the shift ranges can be performed near the steering handle to provide an advantage that the driver need not pull his hand to switch the shift range. Moreover, the shift system need not be provided with all the shift range positions so that it can be reduced in size and improved in its arrangement.

The system of the prior art thus far described is advantageous because the shift ranges can be switched by operating the switches. These switch operations have failed to satisfy all the practical requirements, and a further improvement is still demanded in the facilitation for the arrangement if consideration is taken into the conveniences for the shift range switching operations and the interferences with the peripheral devices.

SUMMARY OF THE INVENTION

A main object of the present invention is to provide a more practical control system for switching shift ranges.

The shift range control system of the present invention is equipped with not only the mechanism for switching the shift ranges by the mechanical operation of the shift lever but also a second range switching mechanism for switching the shift ranges by electric means such as switches. The first range switching mechanism for switching the shift ranges by the mechanical operation is equipped with a block mechanism for selectively inhibiting the shift from the state in which a specific shift range allowing the switching of the shift range by the second range switching mechanism is set. This block mechanism releases the inhibition of the shift by the first range switching mechanism by operating the switches manually.

As a result, the operation for selecting the shift range effecting the engine braking is performed more easily by the first range switching mechanism than by the second range switching mechanism, so that the use of the second range switching mechanism for switching the shift range to that effecting the engine braking is promoted. In other words, the frequency for the driver to bring his hand to the first range switching mechanism for switching the shift range mechanically is reduced to improve the conveniences for the shift range switching operations.

In the present invention, moreover, the return from the shift range lower by two or more steps to the predetermined shift range can be made by a return switch mechanism.

As a result, the operation to return the shift range from a specific one such as the drive range capable of setting all the forward gear stages to the shift range, as set lower by two or more steps than the former by the second range switching mechanism, can be performed by the single operation of the return switch thereby to improve the conveniences of the operation for switching the shift ranges.

In the present invention, moreover, a steering column can be equipped with a first shift lever for switching the shift range by the mechanical operation and a second shift lever for switching the shift range by the electric operation.

As a result, the individual levers for switching the shift ranges are arranged near the steering wheel, so that the shift ranges can be switched without bringing the driver's hand far from the steering wheel. Since any of the forward ranges is selected by operating the second shift lever, the first shift lever need not be provided with the shift positions corresponding to all the shift ranges, so that the first shift lever can be reduced in its shift positions to prevent its physical or visual interference with the peripheral equipments.

In the present invention, the first range switching mechanism for selecting the shift range mechanically can be constructed to function preferentially of the second range switching mechanism for selecting the shift range electrically.

According to this construction, even if the shift range selected by the first range switching mechanism and the shift range selected by the second range switching mechanism are different, the shift range to be set is that which is selected by the first range switching mechanism so that it reflects more correctly upon the intention of the driver. Thus, it is possible to prevent the discrepancy between the intention of the driver and the actually set shift range.

In the present invention, moreover, there can be provided a switch mechanism for making a switching to a shift range lower by two or more steps by the electric operation. According to this construction, the shift range can be switched to one lower by two or more steps by the single operation of the switch mechanism thereby to improve the shift range switching operability.

In the present invention, moreover, when there is detected a situation in which a prime mover overruns, the control to switch the shift range to a higher-speed range is executed, and a signal for making a switching to another shift range is canceled during the switching control.

As a result, as the shift range is switched to a higher-speed one, the gear stage is also switched to a higher-speed one having a smaller gear ratio so that the RPM of the prime mover can be lowered to prevent the overrun of the same in advance. During the control for switching the shift range to a higher-speed one so as to prevent the overrun of the prime mover, on the other hand, the signal from the second range switching mechanism to be operated at will can be canceled, even if outputted, to prevent any overlap controls.

The above and further objects and novel feature of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 16 is a diagram tabulating the applied/released states of frictional engagement elements for setting individual gear stages.

DETAILED DESCRIPTION OF THE PREFERRED EMBODIMENTS

Figure 14:
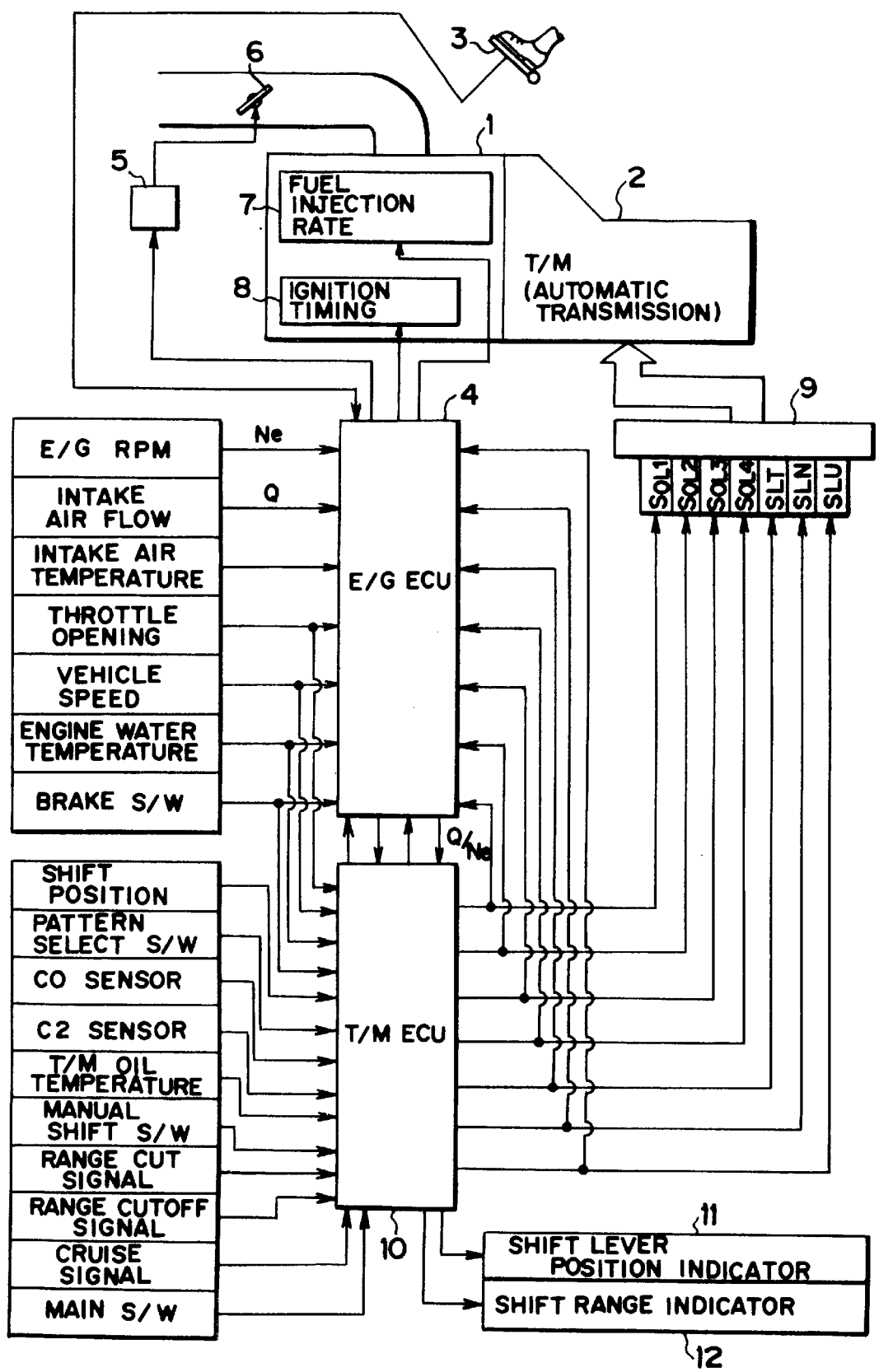
FIG. 14 is a schematic diagram showing an overall control system of an automatic transmission, to which is applied the present invention.

The present invention will be described in more detail with reference to the accompanying drawings. Here will be described an overall control system. FIG. 14 shows the control system of an engine (E/G) 1 as an example of the prime mover and an automatic transmission 2. A signal according to the depression of an accelerator pedal 3 is inputted to an E/G ECU (i.e., an electronic control unit for the engine) 4. The intake pipe of the engine 1 is equipped with an electronic throttle valve 6 to be driven by a throttle actuator 5. The electronic throttle valve 6 is controlled in its degree of opening by a control signal which is outputted according to the depression of the accelerator pedal 3 from the E/G ECU 4 to the throttle actuator 5.

The E/G ECU 4 for controlling the engine 1 is mainly constructed of a central processing unit (CPU), memories (RAM and ROM) and an input/output interface. In addition to the aforementioned signal according to the depression of the accelerator pedal 3, control data including an engine RPM Ne, an intake air flow Q, an intake air temperature, a throttle opening, a vehicle speed, an engine water temperature and a brake switch output signal are inputted to that E/G ECU 4. On the other hand, this E/G ECU 4 is constructed to control the throttle actuator 5 and to output signals to a fuel injector 7 for the torque control at a shifting time and an igniter 8 for changing the ignition timing.

The automatic transmission 2, as connected to the engine 1, is the so-called "electronic control automatic transmission" for controlling the oil pressure electrically to control the shifts and the application/release of a lockup clutch. The oil pressure is controlled by a hydraulic control unit 9. This hydraulic control unit 9 is equipped with: three shift solenoid valves SOL1, SOL2 and SOL3 for executing the shifts mainly; a solenoid valve SOL4 for controlling the engine braking state mainly; a linear solenoid valve SLU for controlling the lockup clutch mainly; a linear solenoid valve SLT for controlling a line pressure in accordance with the throttle opening mainly; and a linear solenoid valve SLN for controlling the back pressure of an accumulator mainly.

There is further provided a T/M ECU (i.e., an electronic control unit for the automatic transmission) 10 for outputting control signals to the individual solenoid valves of that hydraulic control unit 9. This T/M ECU 10 is mainly constructed, like the aforementioned E/G ECU 4, of a central processing unit (CPU), memories (RAM and ROM) and an input/output interface so that it can be united/integrated, if necessary, with the E/G ECU 4. The T/M ECU 10 is constructed to execute arithmetic operations, as based upon input data, in accordance with maps and arithmetic expressions stored in advance, and to output control signals, as based upon the arithmetic results, to the aforementioned individual solenoid valves to control the application/release of the lock-up clutch and the transient oil pressure at the shifting time.

To the T/M ECU 10, moreover, there are inputted control data including not only the aforementioned throttle opening, vehicle speed, engine water temperature and the brake switch output signal but also a shift position, a pattern select switch output signal, an output signal of a C0 sensor for detecting the RPM of a clutch C0, an output signal of a C2 sensor for detecting the RPM of a second clutch C2, the oil temperature of the automatic transmission 2, an output signal of a manual shift switch, a cut signal for switching a shift range to a lower-speed one, a cut-off signal for switching a shift range to a higher-speed one, and a cruise signal to be outputted from a (not-shown) cruise controller for keeping the vehicle speed at a constant value. With the T/M ECU 10, moreover, there are connected a shift lever position indicator 11 for indicating the position of the shift lever, and a shift range indicator 12 for indicating the shift range selected. These indicators 11 and 12 can be mounted in the (not-shown) meter panels which are assembled on the instrument panel. There can also be provided a main switch to be turned ON/OFF for outputting the aforementioned cut signal and cut-off signal effectively. Then, the signal of the main switch is inputted to the T/M ECU 10.

These electronic control units 4 and 10 are connected to transmit the data to each other such that the signals for setting the individual gear stages are transmitted from the T/M ECU 10 to the E/G ECU 4 whereas the intake air flow (Q/Ne) per revolution of the engine 1 is transmitted from the E/G ECU 4 to the T/M ECU 10.

Figure 15:
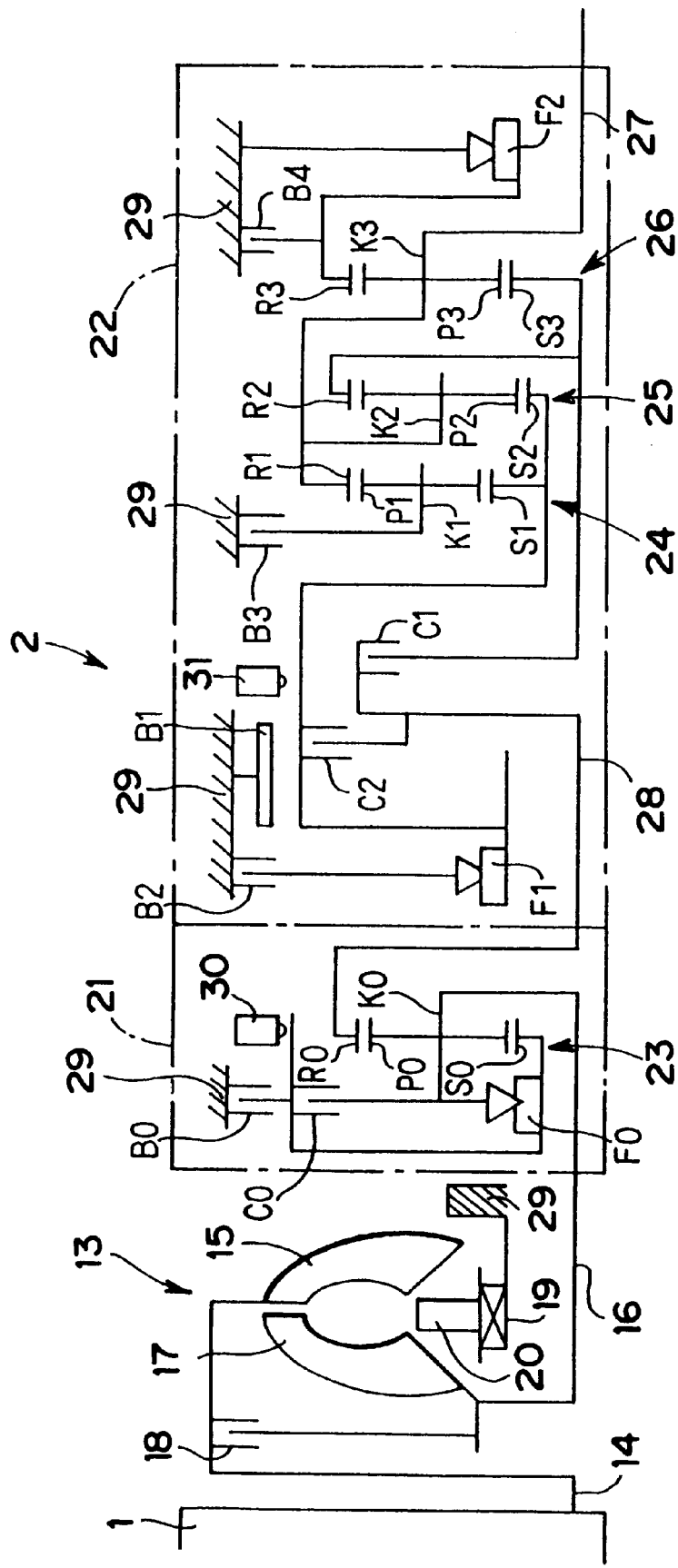
FIG. 15 is a skeleton diagram showing one example of the gear train of the automatic transmission, to which is applied the present invention.

The automatic transmission 2 can set five forward and one reverse gear stages, and its gear train is exemplified in FIG. 15. As shown in FIG. 15, the automatic transmission 2 is connected to the engine 1 through a torque converter 13. This torque converter 13 is equipped with: a pump impeller 15 connected to a crankshaft 14 of the engine 1; a turbine runner 17 connected to an input shaft 16 of the automatic transmission 2; a lockup clutch 18 connecting the pump impeller 5 and the turbine runner 17 directly; and a stator 20 prevented from rotating in one direction by a one-way clutch 19.

The automatic transmission 2 is further equipped with: an auxiliary transmission unit 21 for shifting two high and low stages; and a main transmission unit 22 for shifting the reverse and four forward stages. The auxiliary transmission unit 21 is equipped with: a planetary gear set 23 composed of a sun gear S0, a ring gear R0, and a pinion P0 rotatably supported by a carrier K0 and meshing with those sun gear S0 and ring gear R0; the clutch C0 and a one-way clutch F0 interposed between the sun gear S0 and the carrier K0; and a brake B0 interposed between the sun gear S0 and a housing 29.

The main transmission unit 22 is equipped with: a first planetary gear set 24 composed of a sun gear S1, a ring gear R1 and a pinion P1 rotatably supported by a carrier K1 and meshing with those sun gear S1 and ring gear R1; a second planetary gear set 25 composed of a sun gear S2, a ring gear R2 and a pinion P2 rotatably supported by a carrier K2 and meshing with those sun gear S2 and ring gear R2; and a third planetary gear set 26 composed of a sun gear S3, a ring gear R3 and a pinion P3 rotatably supported by a carrier K3 and meshing with those sun gear S3 and ring gear R3.

The sun gear S1 and the sun gear S2 are integrally connected to each other, and the ring gear R1 and the carriers K2 and K3 are integrally connected to each other. The carrier K3 is connected to an output shaft 27. The ring gear R2 is integrally connected to the sun gear S3. Moreover, a first clutch C1 is interposed between those ring gear R2 and sun gear S3 and an intermediate shaft 28, and the second clutch C2 is interposed between those sun gears S1 and S2 and the intermediate shaft 28.

The housing 29 is equipped with a first brake B1 of band type acting as brake means for braking the rotations of the sun gears S1 and S2. Between these sun gears S1 and S2 and the housing 29, there are interposed a first one-way clutch F1 and a brake B2 in series. The first one-way clutch F1 is applied when the sun gears S1 and S2 are to rotate backward of the input shaft 6.

A third brake B3 is interposed between the carrier K1 and the housing 29, and a fourth brake B4 and a second one-way clutch F2 are interposed in parallel between the ring gear R3 and the housing 29. The second one-way clutch F2 is applied when the ring gear R3 is to rotate backward. The clutches C0, C1 and C2 and brakes B0, B1, B2, B3 and B4 described above are hydraulic frictional engagement elements, the frictional members of which are engaged when the oil pressure is applied thereto.

A C0 sensor 30 is provided for detecting the RPM of the clutch C0 in the auxiliary transmission unit 21, i.e., the input RPM, and a C2 sensor 31 is provided for detecting the RPM of the second clutch C2 in the main transmission unit 22. These sensors 30 and 31 are connected with the T/M ECU 10, as described hereinbefore.

The automatic transmission 2 thus far described is enabled to set the five forward and one reverse gear stages by its individual frictional engagement elements to be applied/released, as tabulated in an application chart of FIG. 16. In FIG. 16: symbols ○ indicate the applied state; symbols ◉ indicate the applied state having no relation to the torque transmission; symbols ● indicate the applied state for effecting the engine braking; and blanks indicate the released state.

Figure 17:
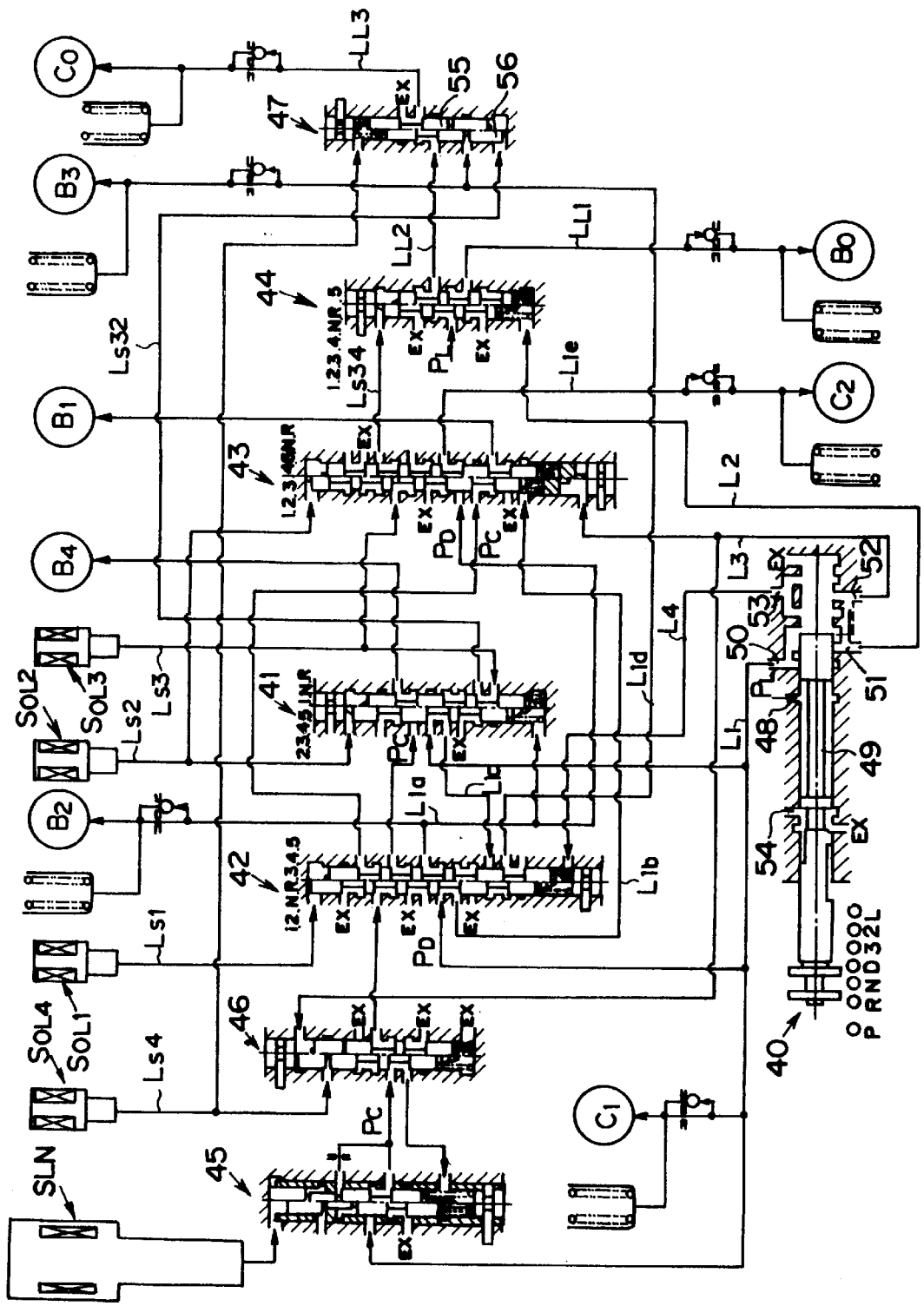
FIG. 17 is a hydraulic circuit diagram showing a portion of the hydraulic circuit of the automatic transmission, to which is applied the present invention.

The hydraulic control unit 9 is equipped with a hydraulic circuit, as shown in FIG. 17, for setting the individual shift ranges and gear stages shown in FIG. 16. Between a manual valve 40 for receiving the feed of a line pressure PL according to the throttle opening and the hydraulic servo means of the aforementioned individual frictional engagement elements, there are interposed: a 1-2 shift valve 41 for controlling the feed/release of a control pressure PC to/from the fourth brake B4 for the engine braking at the 1st speed; a 2-3 shift valve 42 for controlling the feed/release of a drive range pressure PD to/from the second brake B2 for establishing the 3rd speed; a 3-4 shift valve 43 for controlling the feed/release of the control pressure PC to/from the first brake B1 for the engine braking at the 3rd speed and for controlling the feed/release of the drive range pressure PD to/from the second clutch C2 for establishing the 4th and 5th speeds; and a 4-5 shift valve 44 for switching the feed of the line pressure PL to the brake B0 and the clutch C0.

Further interposed are: a pressure control valve 45 for changing the regulated pressure level during a shift in accordance with the signal pressure of the linear solenoid valve SLN by the initial pressure of the drive range pressure (i.e., D-range pressure) thereby to generate the control pressure PC according to the regulated pressure level; an engine braking relay valve 46 for switching the feed/release of the control pressure PC to/from the 2-3 shift valve 42; and a C0 exhaust valve 47 for switching the feed/release of the line pressure PL to/from the clutch C0 through the 4-5 shift valve 44.

Here: the first shift solenoid valve SOL outputs a signal pressure for switching the 2-3 shift valve 42; the second shift solenoid valve SOL2 outputs a signal pressure for switching the 1-2 shift valve 41; and the third shift solenoid valve SOL3 outputs a signal pressure for switching the C0 exhaust valve 47 through the 1-2 shift valve 41. On the other hand, the fourth solenoid valve SOL4 outputs a signal pressure for switching the engine brake relay valve 46 and the C0 exhaust valve 47, and the linear solenoid valve SLN outputs a signal pressure for regulating the pressure to the pressure control valve 45. Moreover, the frictional engagement elements other than the first brake B1 and the fourth brake B4 are equipped with accumulators.

Here will be described in more detail the constructions and functions of the aforementioned individual units. The manual valve 40 is constructed of a spool valve which is connected by mechanical means such as a cable to the shift lever (not-shown) acting as a first range switching mechanism. The manual valve 40 is fed at its input port 48 with the line pressure PL so that the input port 48 is opened, as a spool 49 is moved, to communicate with one or more output ports in accordance with the position of the spool 49 thereby to output the line pressure PL to the communicating output port or ports. In the D-position, specifically, the line pressure PL is outputted only from a D-range port 50. In the "3"-position, the line pressure PL is outputted additionally from a "3"-range port 51. In the "2"-position, the line pressure PL is outputted additionally from a "2"-range port 52. In the L-position, the line pressure PL is outputted additionally from an L-range port 53. In the R-position, on the other hand, the line pressure PL is outputted from an R-range port 54. In the N-position, all the output ports are closed. In the P-position, the input port 48 is opened to communicate with a drain port EX. Here, the aforementioned automatic transmission 2 can select the "4"-range, which is a shift range for inhibiting the highest gear stage or the 5th speed. In this "4"-range, the spool 49 rotates on its center axis in the manual valve 40 so that the oil pressure is outputted from the aforementioned "2"-range port 52.

The pressure control valve 45 is equipped with a spool and a plunger which are urged in one direction by a spring. This control valve 45 regulates the D-range pressure PD, as inputted thereto, according to the output signal of the linear solenoid valve SLN and feeds the control pressure PC to the 2-3 shift valve 42 through the engine brake relay valve 46.

The engine braking relay valve 46 is a change-over valve which is equipped with a spool and a plunger, as urged in one direction by a spring. This relay valve 46 is fed at its plunger with the "2"-range pressure and at its spool with the signal pressure of the linear solenoid valve SLN, and switches the feed of the control pressure PC to the 2-3 shift valve 42 by either of the pressures and the release of the control pressure PC from the 2-3 shift valve 42 by the relief of that pressure.

The 2-3 shift valve 42 is a change-over valve equipped with a spool urged in one direction by a spring. This shift valve 42 is fed with the signal pressure of the first shift solenoid valve SOL1 and the L-range pressure, and switches the feeds of the control pressure PC to the 3-4 shift valve 43 and the 1-2 shift valve 41, and the communications of the D-range pressure with oil passages L1*a* and L1*b* and the drainage of the same.

The 1-2 shift valve 41 is a change-over valve equipped with a spool urged in one direction by a spring. This shift valve 41 is fed with the signal pressure of the second shift solenoid valve SOL2 and the oil pressure from the oil passage L1*a*, and switches the feed of the control pressure PC to the fourth brake B4 and the discharge of the same from the brake B4, and the feed of the signal pressure of the third shift solenoid valve SOL3 to an oil passage LS32 and the discharge of the same from the oil passage LS32.

The 3-4 shift valve 43 is a change-over valve equipped with a spool urged in one direction by a spring through a piston. This shift valve 43 is fed with the signal pressure of the second shift solenoid valve SOL2, the oil pressure from the oil passage L1*b* and an oil pressure from an oil passage L3, and switches the feed and block of the signal pressure of the third shift solenoid valve SOL3 from an oil passage LS3 to and from the 4-5 shift valve 44 via an oil passage LS34, the connection and disconnection between the oil passage L1*a* and an oil passage L1*e*, and the feed and discharge of the control pressure PC to and from the first brake B1.

The 4-5 shift valve 44 is a change-over valve which is equipped with a spool urged in one direction by a spring. This shift valve 44 is fed with the signal pressure of the oil passage LS34 and an oil pressure of an oil passage L2, and switches the feed and discharge of the line pressure PL to and from the C0 exhaust valve 47, and the feed and discharge to and from the brake B0 via an oil passage LL1.

The C0 exhaust valve 47 is a change-over valve which is equipped with a spool 55 and a plunger 56, as urged in one direction by a spring. This exhaust valve 47 is fed with the signal pressure of the fourth solenoid valve SOL4 via the oil passage LS4, the signal pressure of the third solenoid valve SOL3 via the oil passage LS32 and an oil pressure of an oil passage L1*d*, and switches the feed and discharge of the line pressure PL, as fed through the 4-5 shift valve 44, to and from the clutch C0 via an oil passage LL3.

In the shown neutral position of the hydraulic control unit thus constructed, the line pressure PL is fed to the clutch C0 through the 4-5 shift valve 44 and the C0 exhaust valve 47, but the oil passage through the manual valve 40 is closed, so that the oil pressure of the first clutch C1 is drained. In FIG. 17, the displacements of the individual valves across the center lines illustrate the limit positions of the spools to move. Especially for the individual shift valves, the numerals, as divided at the right and left sides of the center lines, indicate the correspondences between the spool positions and the gear stages.

According to the hydraulic control unit, the individual gear stages are set such that the range pressures are regulated whereas the individual shift solenoid valves SOL1 to SOL3 are turned ON/OFF by the electronic controls corresponding to the vehicle speed and the engine load (e.g., the throttle opening) in accordance with the selection of the position of the manual valve, as made by manipulating a shift device. In other words, the individual clutches and brakes are controlled, as illustrated in FIG. 16, so that the individual gear stages can be set in relation to the one-way clutches (OWC), and the engine (E/G) braking state can be established by the output of the signal pressure, as caused by turning ON/OFF the fourth solenoid valve SOL4.

When the signal pressure is outputted from the fourth solenoid valve SOL4 while the 3rd speed is set in the D-range, for example, the spool of the engine braking relay valve 46 is moved to the position, as indicated by the lefthand half of FIG. 17. As a result, the control pressure PC, as originating from the D-range pressure, is fed through the 2-3 shift valve 42 to the 3-4 shift valve 43 thereby to apply the first brake B1. In short, the engine braking is effective at the 3rd speed.

When the signal pressure is outputted from the fourth solenoid valve SOL4 while the 2nd speed is set in the D-range, the oil pressure is fed to one end side of the spool of the C0 exhaust valve 47 so that the spool is moved to the position, as indicated by the lefthand half of FIG. 17. As a result, the line pressure PL, as fed through the 4-5 shift valve 44, is fed to apply the clutch C0 in the auxiliary transmission unit 21 so that the engine braking can be effected at the 2nd speed.

When the signal is outputted from the fourth solenoid valve SOL4 at the 1st speed in the D-range, the control pressure PC is outputted, as in the aforementioned case of the 3rd speed, from the engine braking relay valve 46 to the 2-3 shift valve 42 and is fed from the 2-3 shift valve 42 to the 1-2 shift valve 41 to apply the fourth brake B4. In short, the engine braking can be effected at the 1st speed.

Here, the individual gear stages for the 1st to 5th speeds are set, as in the system of the prior art, by turning ON/OFF the first to third shift solenoid valves SOL1 to SOL3 to switch the individual shift valves 41 to 44 suitably by the output pressures of the solenoid valves, as could be easily understood from the hydraulic circuit of FIG. 17.

Thus in the automatic transmission 2, the individual gear stages can be set by the electric controls, and the engine braking effects at the 3rd or lower gear stages can be set by controlling the fourth solenoid valve SOL4 electrically. By making use of these functions, the shift range control system according to the present invention is enabled to switch the forward ranges electrically.

Figure 1A:
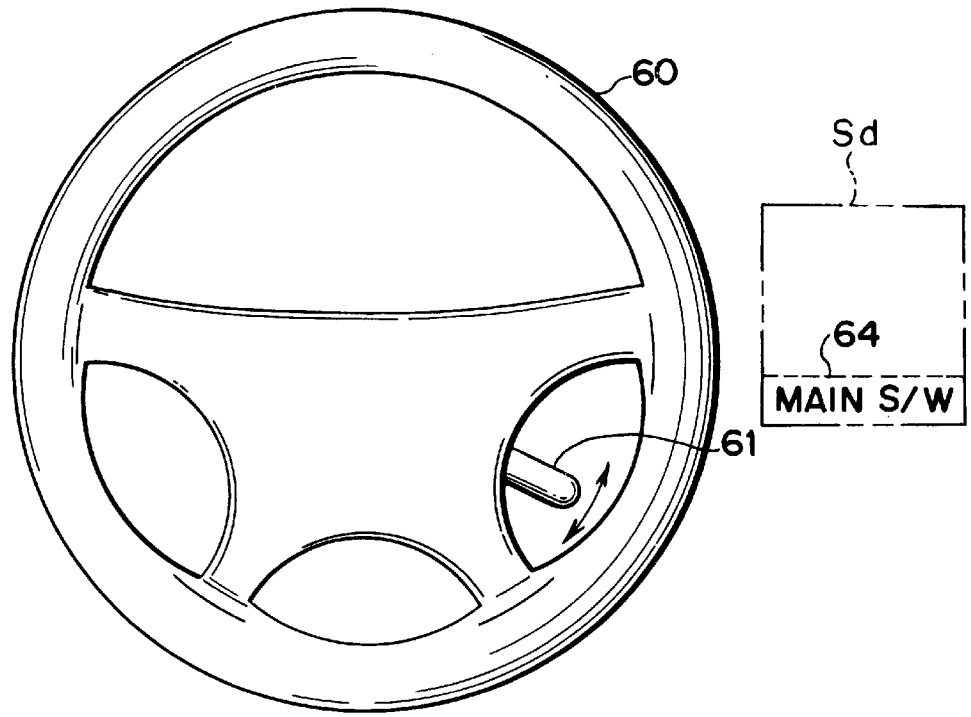
FIG. 1A is a front elevation showing a steering wheel equipped with a second range switching mechanism according to the present invention.
Figure 1B:
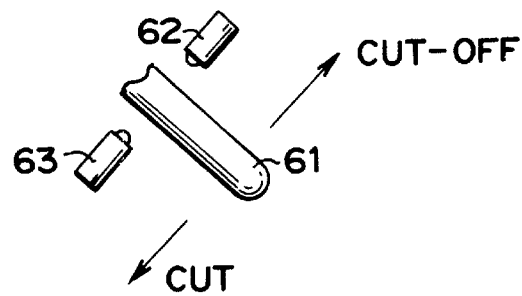
FIG. 1B is a partially enlarged view showing a second shift lever of the second range switching mechanism.
Figure 1C:
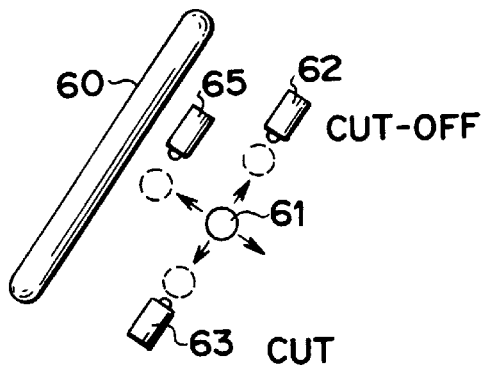
FIG. 1C is a side elevation showing the second range switching mechanism, as taken from the side of the steering wheel.

A range switching mechanism, i.e., a second range switching mechanism for switching the forward ranges electrically is exemplified in FIGS. 1A, 1B and 1C. Reference numeral 60 appearing in these figures designates a steering wheel (or handle), and a second shift lever 61 is attached to the (not-shown) steering column having the steering wheel 60 mounted thereon. The second shift lever 61 is so arranged near the steering wheel 60 as to protrude radially from the steering column and is given such a length that it can be manipulated by a finger of the hand gripping the steering wheel 60. Moreover, the second shift lever 61 is so elastically held and normally positioned in a neutral position that it can be turned around the steering column and pulled toward the steering wheel 60.

The turning motion of the second shift lever 61 in the circumferential direction is to increment/decrement the shift ranges and is equipped with switches 62 and 63 for detecting the turning motion. These switches 62 and 63 are the so-called "momentary switches" for outputting signals each time they are turned ON. Of these, the switch 62, as located in a position turned counter-clockwise of FIG. 1A from the neutral position of the second shift lever 61, is a cut-off switch for outputting a signal to switch (or up-range) the shift range to a higher-speed one. The switch 63, as located at the opposite side, is a cut switch for outputting a signal to switch (or down-range) the shift range to a lower-speed one.

These cut-off switch 62 and cut switch 63 are connected with the aforementioned automatic transmission electronic control unit (T/M ECU) 10. These switches 62 and 63 are so constructed that they are active, when the D-range is set, to output their electric signals. This can be achieved by activating the circuits of the switches 62 and 63 when the D-range is selected by the (not-shown) shift lever for switching the aforementioned manual valve 40 mechanically. Alternatively, the individual switches 62 and 63 may be activated by turning ON a main or enabling switch 64 which is mounted in a suitable position on the shift device Sd.

Moreover, the second shift lever 61 is pulled toward the steering wheel 60 so that the shift range, as electrically set by turning the second shift lever 61 circumferentially of the steering column, may be canceled to restore the D-range. In order to detect this pulling operation of the second shift lever 61, there is provided a return switch 65. This return switch 65 is connected with the T/M ECU 10 so that the signal accompanying the return of the second shift lever 61 may be inputted to the T/M ECU 10. Here, the arranged position and the manipulating directions of the second shift lever 61 are shown in an enlarged scale in FIG. 1C.

The shift range can be switched by manipulating the second shift lever 61 when the manual valve 40 is in the D-range position, that is, when the D-range is selected by the shift device for selecting the shift range mechanically. Specifically, the shift range is incremented or decremented when the cut switch 63 or the cut-off switch 62 outputs its signal in the D-range. This increment/decrement of the shift range is executed by switching the prevailing shift range to one lower or higher by one step. Specifically, each time the cut switch 63 outputs its signal, that is, each time the second shift lever 61 is once turned clockwise of FIG. 1A, the shift range is switched sequentially in the order of D-range→"4"-range→"3"-range→"2"-range→L-range. Each time the cut-off switch 62 outputs its signal, that is, each time the second shift lever 61 is once turned counter-clockwise, on the other hand, the shift range is switched sequentially in the order of L-range→"2"-range→"3"-range→"4"-range→D-range.

Each of these shift ranges is set in advance with the gear stages to be set and to effect the engine braking, and these gear stages are stored in advance as the maps in the ECU 10. There are further stored the ON/OFF patterns of the solenoid valves for effecting the engine braking. Moreover, these shift maps and solenoid patterns are changed to set a predetermined one of the shift ranges each time the cut switch 63 or the cut-off switch 62 is turned ON. In the state of the D-range, the output signal of the cut-off switch 62 is canceled even when this switch 62 is turned ON, because of no higher shift range. In the L-range, the output signal of the cut switch 63 is also canceled even when this switch 63 is turned ON, because of no lower shift range.

As the shift range is switched to a lower one, a downshift may be accordingly caused to increase the engine RPM. For protecting the engine 1, therefore, the output signal of the cut switch 63 is canceled, if this switch 63 is turned ON in the state allowing the overrun of the engine 1, to keep the prevailing shift range. This function is similar to the inhibition of the down-range in the shift device of the prior art.

When the return switch 65 is turned ON, the manual valve 40 is manually moved to set the selected D-range. This setting is executed by changing the shift map for controlling the shift range into one for the D-range and by turning ON/OFF the solenoid valves in accordance with the map.

According to the range control system thus constructed, the shift ranges for the forward runs can be switched by manipulating the second shift lever 61 arranged near the sheering wheel 60. As a result, the shift ranges can be switched while the driver is gripping the steering wheel 60 and gazing forward, thereby to improve the shift range switching operation. Moreover, the D-range can be directly set by turning ON the return switch 65 with the second shift lever 61. As compared with the operation in which the cut-off switch 62 turned ON several times to restore the D-range, therefore, the return to the D-range can be facilitated to improve the shift range switching operation better.

Here is considered a vehicle which is equipped with a cruise control system for keeping the running speed constant. This cruise control system is activated, when the second shift lever 61 is manipulated to select the "4"-range, but is inactivated when the a lower shift range is selected by manipulating the second shift lever 61. These operations are performed to prevent the vehicle speeds and the gear stages from overlapping.

In the range switching system thus far described according to the present invention, the forward ranges can be shifted from one to another by the electric switching device, and this electric switching can be effected even with the manual valve 40 being set in the D-range. As a result, the switching operation for shifting the forward ranges need not always be accomplished by the second shift lever 61. On the other hand, the mechanical shift device for controlling the manual valve 40 may be constructed to have only the D-range position for the forward runs. These points are considered to exemplify a construction shown in FIG. 2.

Figure 2:
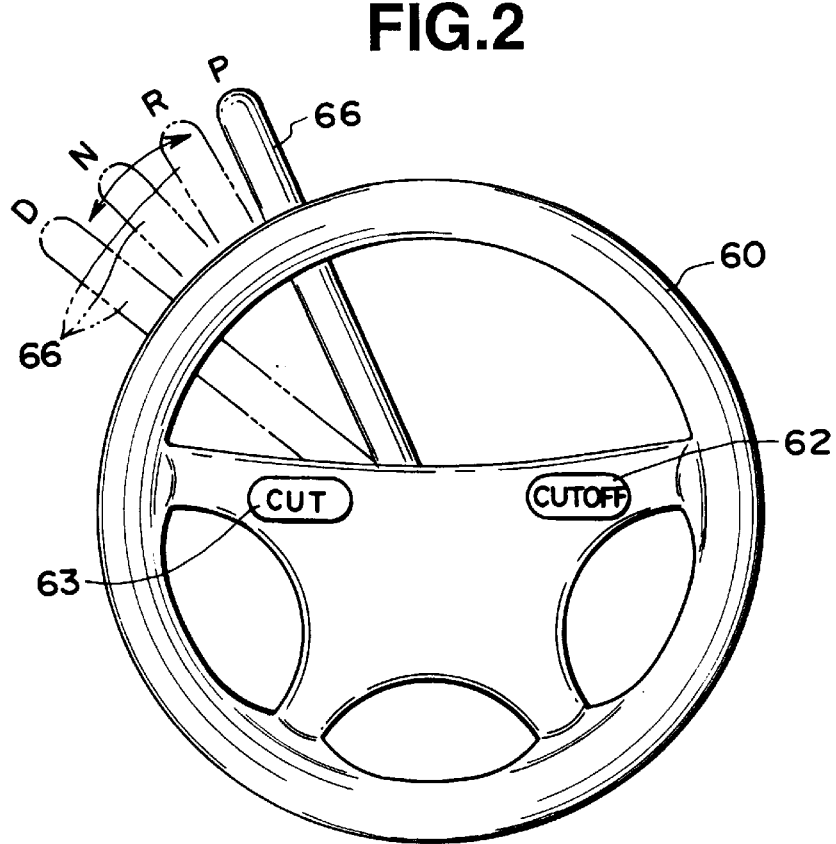
FIG. 2 is a front elevation showing an example, in which a first shift lever or a first range switching mechanism according to the present invention is arranged at a steering column and in which a cut-off switch and a cut switch are mounted on the front side of the sheering wheel.

In the construction shown in FIG. 2, a first shift lever 66, as connected to the manual valve 40 by mechanical means such as a cable, is provided to protrude radially of the steering column. This first shift lever 66 is constructed like the lever of the so-called "column type" shift device of the prior art such that it is turned circumferentially of the steering column to switch the manual valve 40. In the example shown in FIG. 2, the first shift lever 66 is provided with the four range positions of the parking (P), reverse (R), neutral (N) and drive (D) positions, which are arranged counter-clockwise sequentially in the recited order, as shown in FIG. 2. Here, it is arbitrary that the (not-shown) shift button has to be depressed between the P-range and the R-range and between the R-range and the N-range.

On the other hand, the cut-off switch 62 and the cut switch 63 for switching the shift ranges electrically in the D-range are arranged near the center of the steering wheel 60. These switches 62 and 63 are constructed of the momentary push button switches. On the other hand, the switches 62 and 63 may be mounted on the steering wheel 60 but may alternatively be mounted on the steering column so that their positions may not be changed by the turn of the steering wheel 60.

The construction, as shown in FIG. 2, not only can achieve effects similar to those obtained by the system having the construction shown in FIG. 1 but also can eliminate the shift device, as arranged sideways of the driver's seat, of the prior art thereby to improve the facilitation for arranging the remaining devices to be mounted on the vehicle. On the other hand, a first shift lever 66 is positioned ahead of the steering wheel 60. However, since the range positions to be selected by the first shift lever 66 are the above-specified four positions, neither the glance of the driver on the (not-shown) meter panel or the center cluster nor the forward field of view can be shielded by the first shift lever 66 thereby to prevent deterioration in the visibility. This visibility of the center cluster or the like can be improved by making the length of the first shift lever 66 as small as possible.

Figure 3:
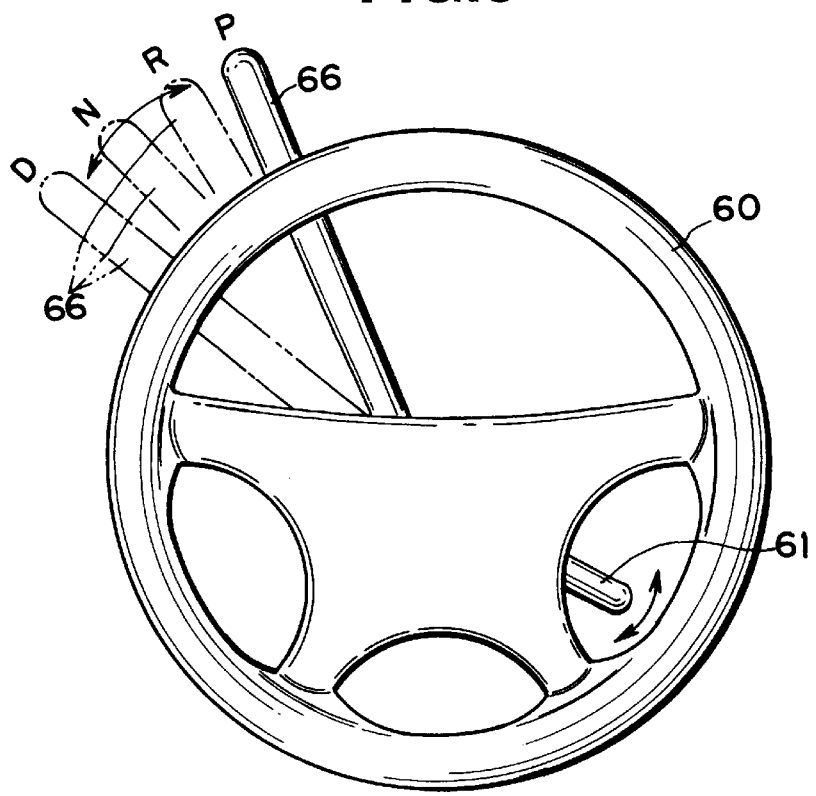
FIG. 3 is a front elevation showing an example, in which the first shift lever and the second shift lever according to the present invention are mounted on the steering column.

FIG. 3 shows still another example, in which there are provided the second shift lever 61 of FIG. 1 and the first shift lever 66 of FIG. 2. Of these shift levers 61 and 66, the second shift lever 61 is more frequently operated during the drive and may preferably be arranged closer to the steering wheel 60 than the first shift lever 66. In this construction, the second shift lever 61 can be well manipulated by the finger of the hand which is left on the steering wheel 60. Here, these first and second shift levers 61 and 66 are arranged at a displacement circumferentially of the steering column from each other because they are manipulated by the different hands.

Figure 4:
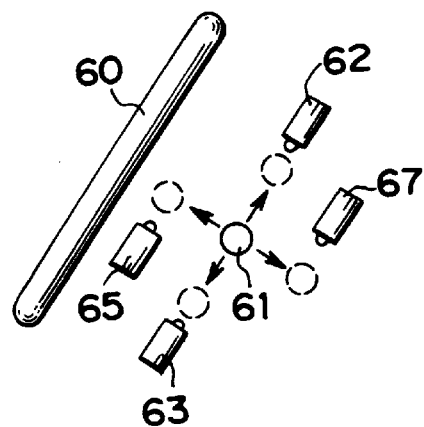
FIG. 4 is a side elevation showing an example which is equipped with a switch capable of switching a change to one lower by two or more steps, as taken from the side of the steering wheel.
Figure 5:
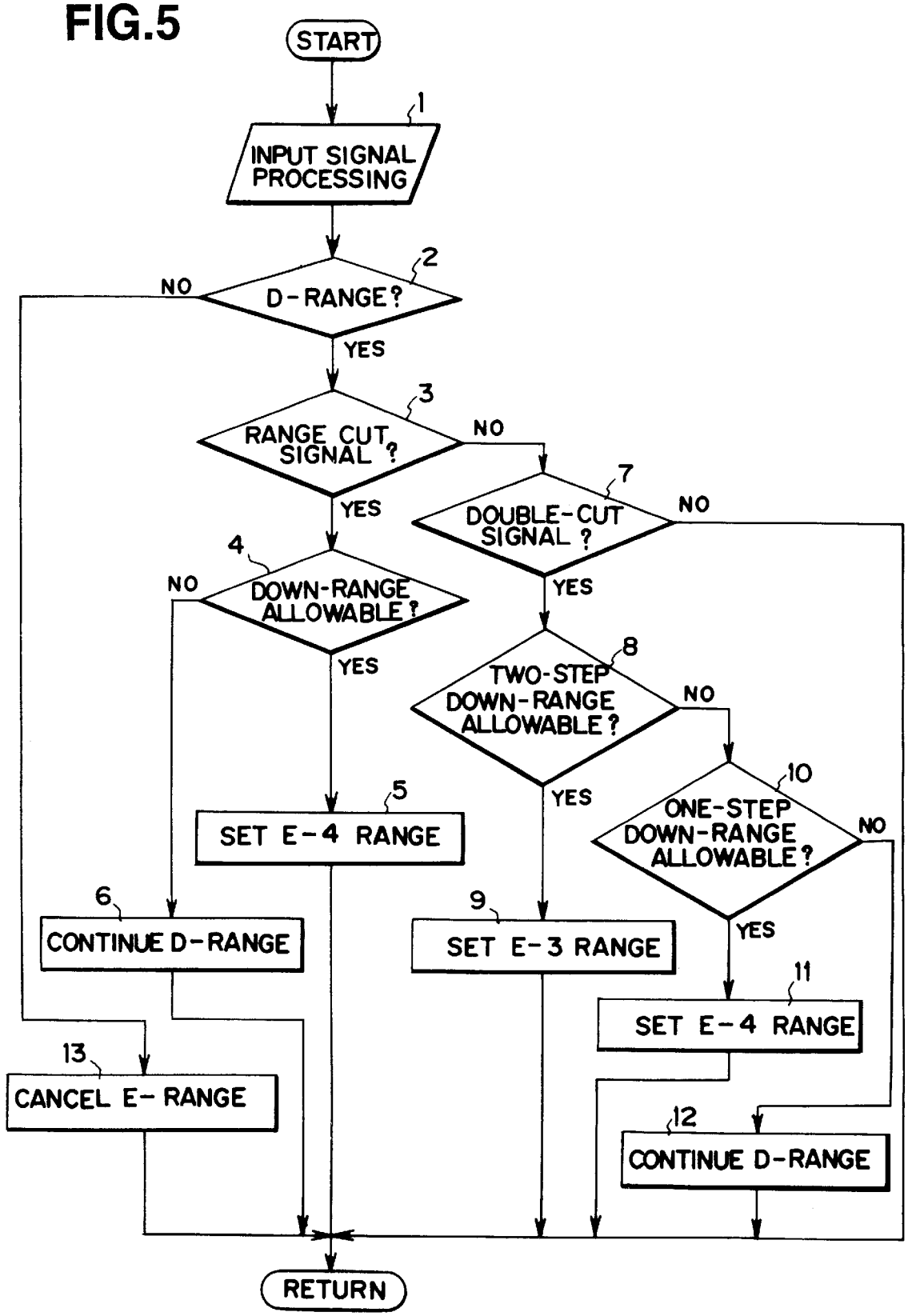
FIG. 5 is a flow chart showing one example of a down-range control to be effected by an electric range switching mechanism.

Although the aforementioned return switch 65 controls a return to restore the D-range from a lower shift range, there can be provided a mechanism for performing a similar switching of shift ranges by two or more steps by a single action. This mechanism is exemplified in FIG. 4, in which the second shift lever 61 is so constructed as can be moved from its neutral position apart from the steering wheel 60 (i.e., rightward of FIG. 4) and in which a double-cut switch 67 is provided in addition. This double-cut switch 67 is connected with the T/M ECU 10 so that it is activated to output a signal, when turned ON by the second shift lever 61, thereby to switch the prevailing shift range to one lower by two steps on the basis of the output signal. One example of the control by the range control system, as equipped with the double-cut switch 67, is shown in FIG. 5. Here, FIG. 5 corresponds to the control example in which the shift range is the D-range, but the range control system can also be applied to the case in which the prevailing shift range is another forward range.

First of all, the input signal process is executed (at Step 1) by initializing the system and reading the data. It is then decided (at Step 2) on the basis of the shift position signal whether or not the D-range is selected. When this D-range is selected, the shift range can be switched by the cut-off switch 62 and the cut switch 63. When the answer of Step 2 is YES, it is decided (at Step 3) whether or not the cut signal is, that is, whether or not the signal is outputted from the cut switch 63.

When the ON signal is outputted from the cut switch 63 to affirm the answer of Step 3, it is decided (at Step 4) whether or not the condition for allowing the downshift is satisfied. When the answer of Step 4 is YES, the "4"-range lower by one step than the prevailing D-range is electrically set (at Step 5). Specifically, the gear stages up to the 4th speed are set on the basis of the shift maps, i.e., the vehicle speed and the throttle opening by activating the first to fourth solenoid valves SOL1 to SOL4 while leaving the manual valve 40 in the D-range position. This setting is tentatively expressed by the "E-4 range" in FIG. 5.

When the condition for allowing the downshift is not satisfied to deny the answer of Step 4, on the other hand, the prevailing shift range or the D-range is continued (at Step 6).

When the cut signal is not outputted to deny the answer of Step 3, on the other hand, it is decided (at Step 7) whether or not the double-cut signal is outputted. Specifically, it is decided whether or not the double-cut switch 67 is turned ON by operating the second shift lever 61. When the double-cut signal is outputted to affirm the answer of Step 7, it is decided (at Step 8) whether or not a condition for allowing a two-step downshift is satisfied.

When the condition for allowing the two-step downshift is satisfied, the prevailing shift range is switched to the "3"-range lower by two steps (at Step 9). This setting is performed by changing the shift maps without activating the manual valve 40, for example, so that the gear stages up to the 3rd speed are set on the basis of the changed shift maps, i.e., the vehicle speed and the throttle opening by activating the first to fourth solenoid valves SOL1 to SOL4 in accordance with the shift maps, while effecting the engine braking at the 3rd speed. This shift range is tentatively expressed by the "E-3 range" in FIG. 5.

When the condition for allowing the two-step downshift is not satisfied to deny the answer of Step 8, on the other hand, it is decided (at Step 10) whether or not a condition for allowing a one-step downshift is satisfied. This is a decision step similar to the aforementioned Step 4. Hence, the E-4 range is set (at Step 11) when the answer of Step 10 is YES, but the prevailing shift range or the D-range is continued (at Step 12) when the same answer is denied.

When a shift range other than the D-range is selected by operating the manual valve 40 mechanically to deny the answer of Step 2, the range (i.e., the E-range in FIG. 5) to be set by controlling the first to fourth solenoid valves SOL1 to SOL4 electrically is canceled (at Step 13).

The operations of Steps 3 and 7 correspond to down-range detecting means of the present invention, and the operations of Steps 4, 8 and 10 correspond to allowable condition deciding means.

Figure 6A:
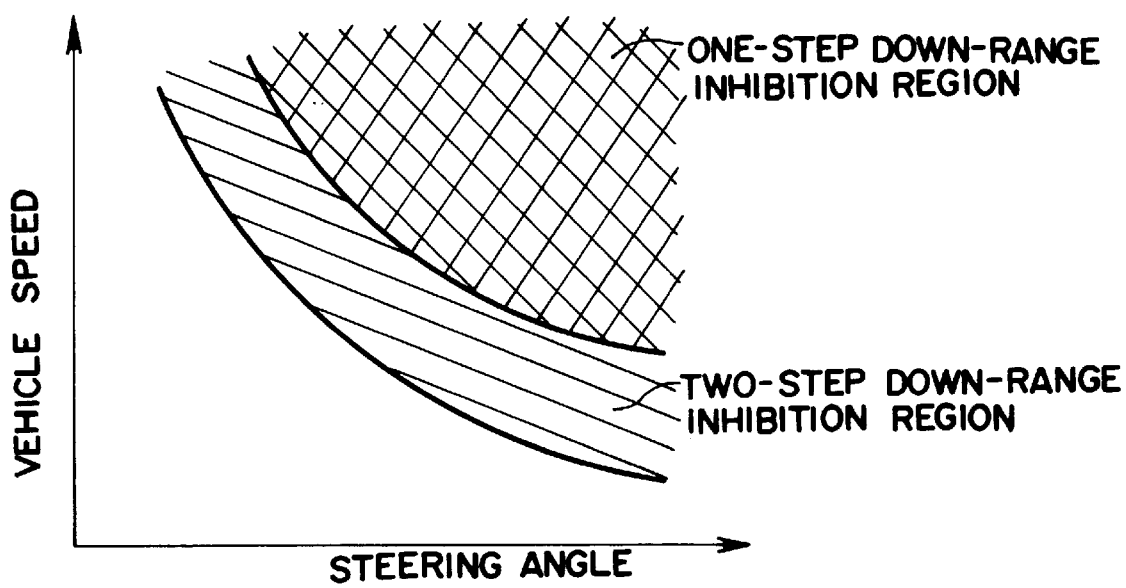
FIG. 6A illustrates one example of a region inhibiting a down-range from the 5th speed of a D-range.
Figure 6B:
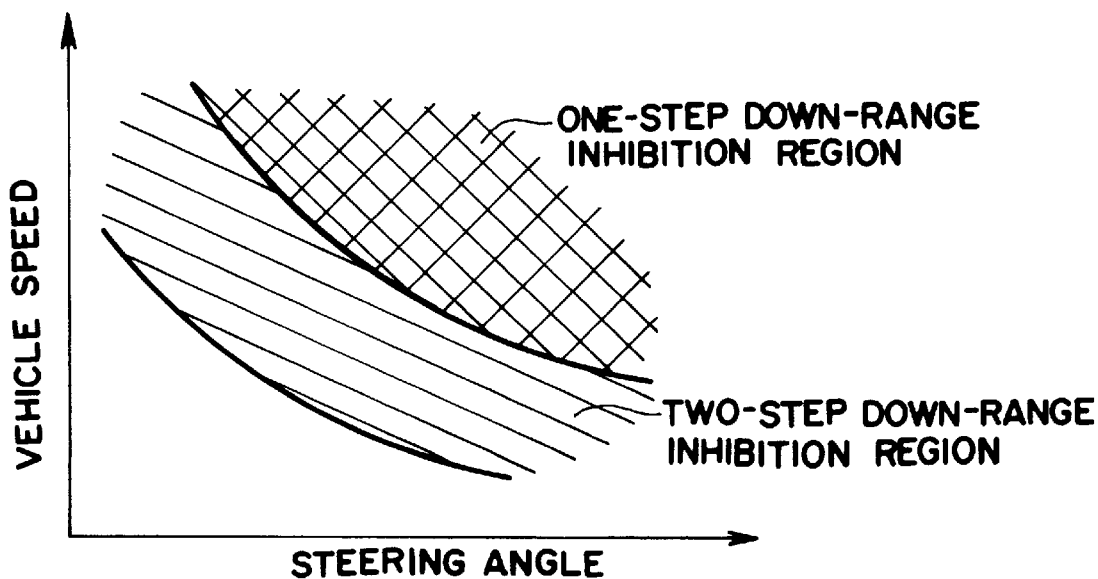
FIG. 6B illustrates one example of a region inhibiting a down-range from the 3rd speed of the D-range.

Here will be described the condition for allowing the downshift to be decided at Steps 4, 8 and 10. At a downshift, as well known in the art, the gear ratio increases to augment the drive force and the accelerability thereby to change the behavior of the vehicle. While the vehicle is turning, for example, the transverse force at the wheels is lowered with the increase in the drive force so that the turning-round characteristics will change. The vehicle will also change its behavior when it comes into the engine braking state. As illustrated in FIG. 6A or 6B, for example, a one-step down-range inhibition region or a two-step down-range inhibition region is set for each gear stage in the prevailing shift range on the basis of the steering angle and the vehicle speed. If the running state, as defined by the steering angle and the vehicle speed, belongs to that inhibition region, the condition for the one-step down-range inhibition or the two-step down-range inhibition is satisfied. Each down-range inhibition may be conditioned on the overrun of the engine 1, because the RPM of the engine 1 increases with the increase in the gear ratio when a down-range occurs.

On the other hand, the control thus far described is exemplified by the case in which the downshift follows the switching of a shift range to a lower side. This downshift is not caused, even if the shift range is switched when an intermediate or lower gear stage such as the 3rd speed is set in the D-range because of a low vehicle speed. In this case, the shift range may be instantly switched to that which has the prevailing gear stage as its highest one. When a down-range is made while the vehicle is running at the 3rd speed, for example, the shift range reached may be the "3"-range having the 3rd speed as its highest gear stage. This down-range control can be executed by detecting the prevailing gear stage, by reading the shift maps on the basis of the detection result, and by controlling the solenoid valves on the basis of the read shift maps.

When the cut-off switch 62 or the cut switch 63 is turned ON to switch the shift range, as described above, the manual valve 40 is left fixed in the D-range, and the second shift lever 61 has restored its neutral position. These cut-off switch 62 and cut switch 63 have also restored their states before turned ON, even when they are made of push button switches. Although the shift range can be switched, therefore, its switching mechanism does not change so that the actually set shift range cannot be visually recognized. Thus, the shift range is indicated by an indicator when it is switched by the switch operations.

Figure 7:
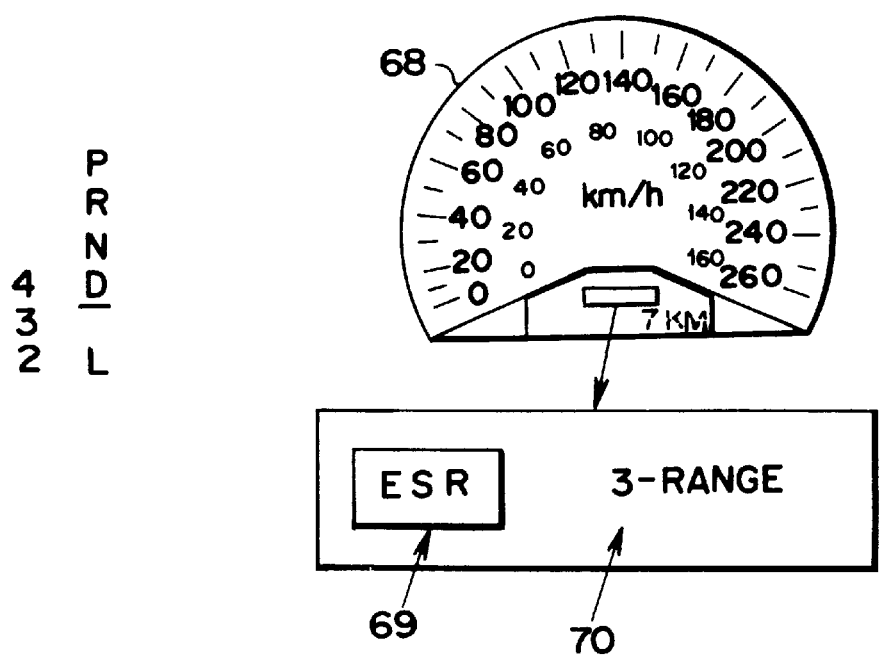
FIG. 7 is a schematic diagram showing one example of a shift range indicator.

This indication is exemplified in FIG. 7. In a meter panel, there is lit or made brighter such one of letters P, R, N, D, 4, 3, 2 and L as corresponds to the position of the shift lever for activating the manual valve 40 mechanically. Simultaneously with this, both an indication 69 of "ESR" indicating that the shift range is electrically selected and an indication 70 indicating the prevailing shift range appear in a speed meter 68. These operations are controlled by the electronic control unit (ECU) 10.

As could be understood from the individual embodiments thus far described, the first shift lever 66 for switching the manual valve 40 mechanically is operated mainly at the running start, and the switching of the shift range during the run is effected mainly by operating the second shift lever 61, the cut-off switch 62 or the cut switch 63. It is, therefore, sufficient that the shift levers for selecting the P-range or the R-range mechanically can select the necessary minimum shift range, and that they can be arranged at the floor sideways of the driver's seat or on the instrument panel as in the ordinary vehicle of the prior art.

Figure 8:
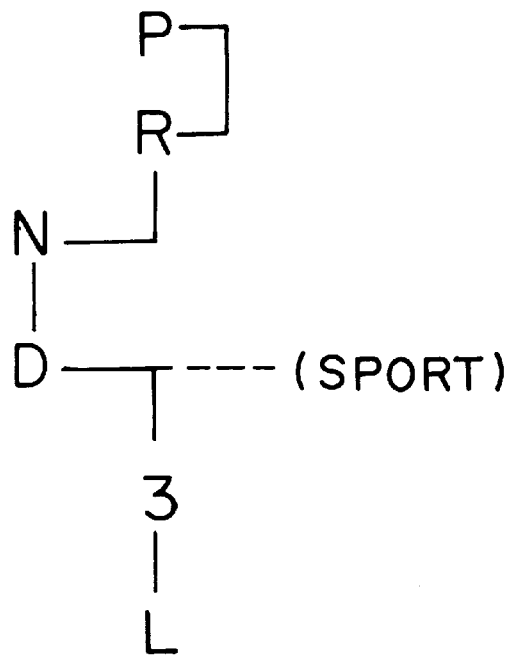
FIG. 8 is a diagram showing an array, as made on a floor or instrument panel, of the shift positions of the first shift lever for switching the shift range mechanically.

FIG. 8 schematically shows one example of the so-called "gate type shift lever" which is arranged on the floor or the instrument panel. The individual shift positions including the P-range, R-range, N-range, D-range, "3"-range and L-range are arrayed in the recited order from the front side or upper side of the vehicle, as shown in FIG. 8. Here, the solid lines joining the individual shift positions of FIG. 8 indicate the guide grooves for guiding the shift lever being moved. If the shift positions are constructed to enable the so-called "sport mode" to be selected for setting the individual gear stages manually, a shift position for the sport mode may be set in the position, as indicated by "(sport)" in FIG. 8.

Figure 9:
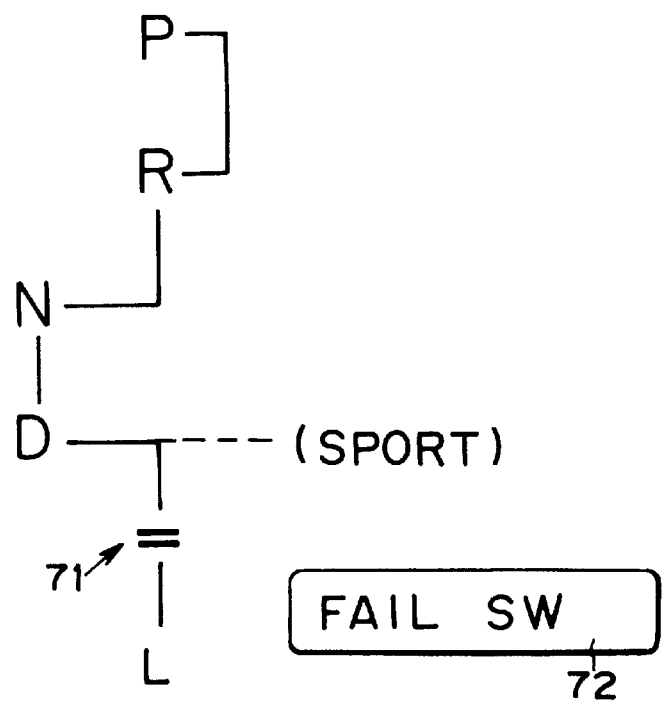
FIG. 9 is a diagram showing another array, as made on the floor or instrument panel, of the shift positions of the first shift lever for switching the shift range mechanically.

On the other hand, FIG. 9 shows an example which is constructed such that the "3"-range position is eliminated from the construction shown in FIG. 8 and such that a shift to the L-range or the engine braking range is selectively inhibited. Specifically, the forward ranges can be easily selected by the electric switching mechanism including the second shift lever 61 and the cut-off switch 62 or the cut switch 63. It is, therefore, sufficient that the shift device for selecting the shift range mechanically can select the D-range as the forward range and another engine braking range against a failure.

In order to prevent the shift lever from being shifted in the ordinary running state to the engine braking range (i.e., the L-range in the shown example), therefore, the construction of FIG. 9 is equipped with a block mechanism 71 such as a pin which is fitted in a guide groove so that it may be opened to allow the shift lever to move to the L-range position by operating a fail switch 72 arranged in a suitable position. Here, the fail switch 72 and the block mechanism 71 may be connected either electrically or through mechanical means such as a link. Hence, the member such as the pin protruded from the guide groove corresponds to block means of the present invention, and the means such as the fail switch for retracting the pin corresponds to refuge means of the present invention.

Figure 10:
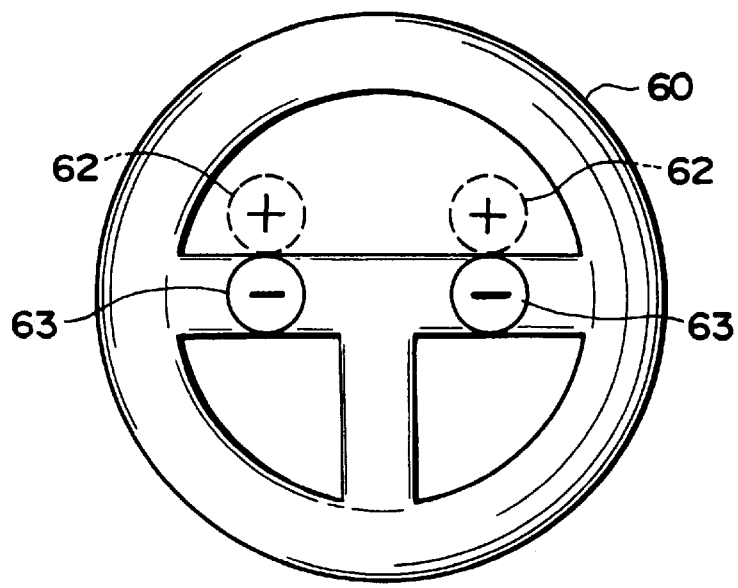
FIG. 10 is a schematic diagram showing an example in which a cut-off switch and a cut switch are arranged on the steering wheel.

Moreover, the cut-off switch 62 for outputting the up-range signal and the cut switch 63 for outputting the down-range signal can be attached to the front (facing the driver) and the back (facing the instrument panel) of the steering wheel 60. This example is schematically shown in FIG. 10. The cut-off switch 62, as indicated by a plus symbol surrounded by a broken circle, is mounted on the back of the steering wheel 60, and the cut switch 63, as indicated by a minus symbol surrounded by a solid circle, is mounted on the front of the steering wheel 60. With this construction, the driver can switch the shift range with the thumb and forefinger of his hand gripping the steering wheel 60.

Figure 11:
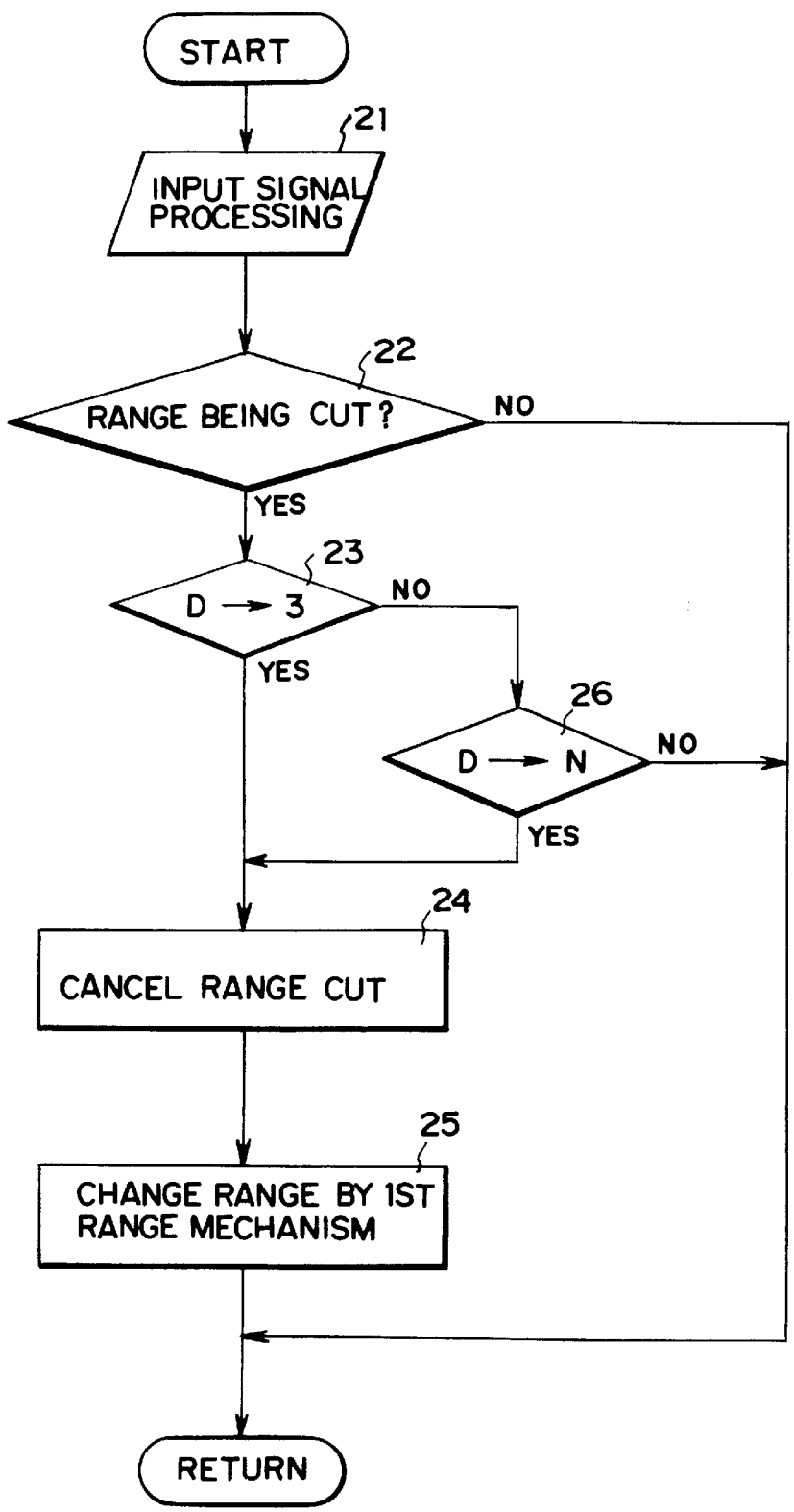
FIG. 11 is a flow chart for explaining an example of the control in which the switching is made to a shift range other than the D-range by the first shift lever while the shift range is being electrically selected.

The mechanism including the first shift lever 66 for switching the shift range mechanically and the mechanism including the second shift lever 61 and the cut-off switch 62 or the cut switch 63 for switching the shift range electrically can be operated independently of each other. With the shift range being electrically selected, therefore, the first shift lever 66 may be operated to switch the manual valve 40. In this possible case, the dominant is the shift range which is set by switching the manual valve 40. This control is executed according to the control routine shown in FIG. 11, for example.

Specifically, the input signal processing is executed (at Step 21), and it is then decided (at Step 22) whether or not the range is being cut. It is electrically decided on the basis of the control state in the electronic control unit (ECU) 10 whether or not the cut switch 63 or the cut-off switch 62 is turned ON to switch the shift range. When the answer of Step 22 is NO, this routine is skipped out without any control. When the answer is YES, on the other hand, it is decided (at Step 23) whether or not the shift range has been switched by the mechanical shift mechanism from the D-range capable of switching the shift range electrically to another shift range such as the "3"-range. This decision can be made on the basis of the output signal of the shift position sensor which is usually attached to the shift device.

When it is decided that the shift range has been switched to the "3"-range by operating the first shift lever 66, the cut control is canceled (at Step 24). Then, the shift map is returned to that for the D-range so that the solenoid valves SOL1 to SOL4 are controlled according to the returned shift map thereby to set the gear stages in the D-range on the basis of the running state. In short, the shift range is switched (at Step 25) to that which is selected by the mechanical range switching mechanism such as the first shift lever 66.

When the answer of Step 23 is NO because of no shift from the D-range to the "3"-range, on the other hand, it is decided (at Step 26) whether or not the shift range has been switched to the N-range by the mechanical range switching mechanism such as the first shift lever 66. When the answer of this Step 26 is NO, the routine is skipped out without any control. When the answer is YES, on the other hand, the routine advances sequentially to Steps 24 and 25, at which the cut control is canceled and at which the N-range is set.

The mechanical range switching mechanism for switching the shift range by operating the first shift lever 66 or the like requires the operation based on a more positive intention of the driver. As a result, the facilities and conveniences of the range switching system can be improved by taking preference of the shift range which is selected by the range switching mechanism.

Figure 12:
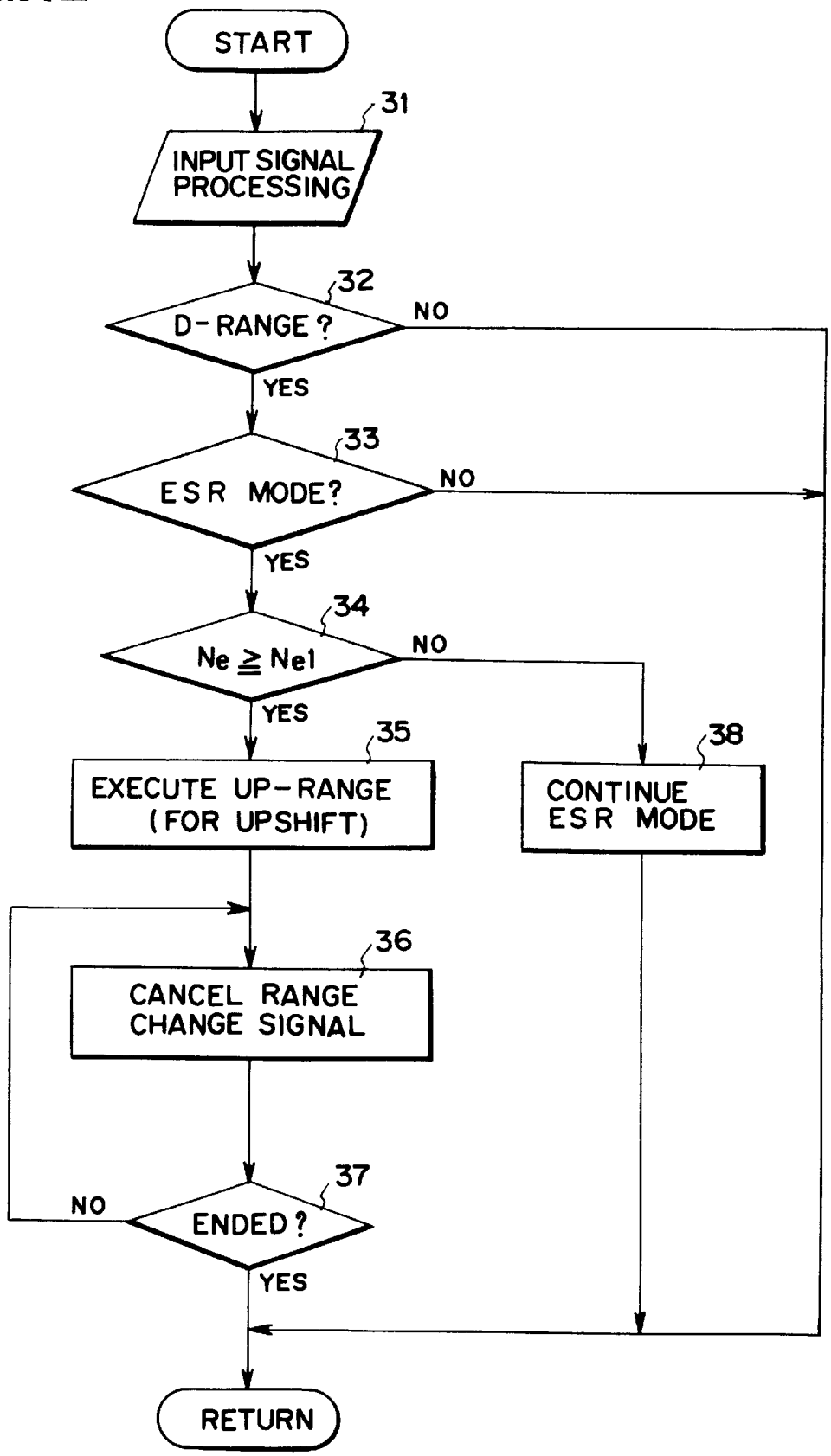
FIG. 12 is a flow chart for explaining an example of the control in which the engine may overrun.

Since the switching of the shift range by the second shift lever 61 and the cut-off switch 62 or the cut switch 63 of push button type is executed by setting the shift range electrically, the shift range thus set can be changed without any manual operation. The control example of FIG. 11 adopts it as the factor for changing or canceling the shift range set electrically that the shift range is changed by the mechanical operation. Despite of this adoption, however, the shift range switching system may change the electrically set shift range by another factor. FIG. 12 shows a control example in which the electrically set shift range is changed on the basis of the RPM of the engine 1.

In FIG. 12, the input signal processing is executed first of all (at Step 31). After this, it is decided (at Step 32) whether or not the D-range is selected by the shift lever such as the first shift lever 66 for selecting the shift range mechanically. This is because the shift range can be electrically switched in this embodiment only when the D-range is selected. When the answer of Step 32 is NO, therefore, this control routine is skipped out. When the answer is YES, it is decided (at Step 33) whether or not the electronic shift range (ESR) control mode for selecting the shift mode electrically is entered. This can be decided, for example, in dependence upon whether or not the aforementioned main switch 64 is turned ON or whether or not the cut-off switch 62 or the cut switch 63 is turned ON to switch the shift range.

This control routine is skipped out when the answer of Step 33 is NO. When the answer is YES, on the other hand, it is decided (at Step 34) whether or not the engine RPM Ne exceeds a predetermined reference value Ne1. The operation of Step 34 corresponds to RPM deciding means of the present invention. This reference RPM Ne1 is so set to a value lower than an overrun RPM Ne0 of the engine 1 as to estimate the increase in the RPM for the delay time of the electric upshift control. When it is decided at Step 34 that the engine RPM Ne exceeds the reference RPM Ne1, therefore, the engine 1 may overrun, and a control is made (at Step 35) to switch the shift range to a higher-speed one. This operation of Step 35 corresponds to up-range means of the present invention. In response to the output signal from the electronic control unit (ECU) 10, more specifically, any of the solenoid valves SOL1 to SOL4 is switched to execute the up-range by the electric control. Because of the high engine RPM Ne in this case, the gear stage is upshifted to a higher-speed one in accordance with the up-range. As a result, according to the drop in the gear ratio, the engine RPM Ne drops to prevent the overrun.

Figure 13:
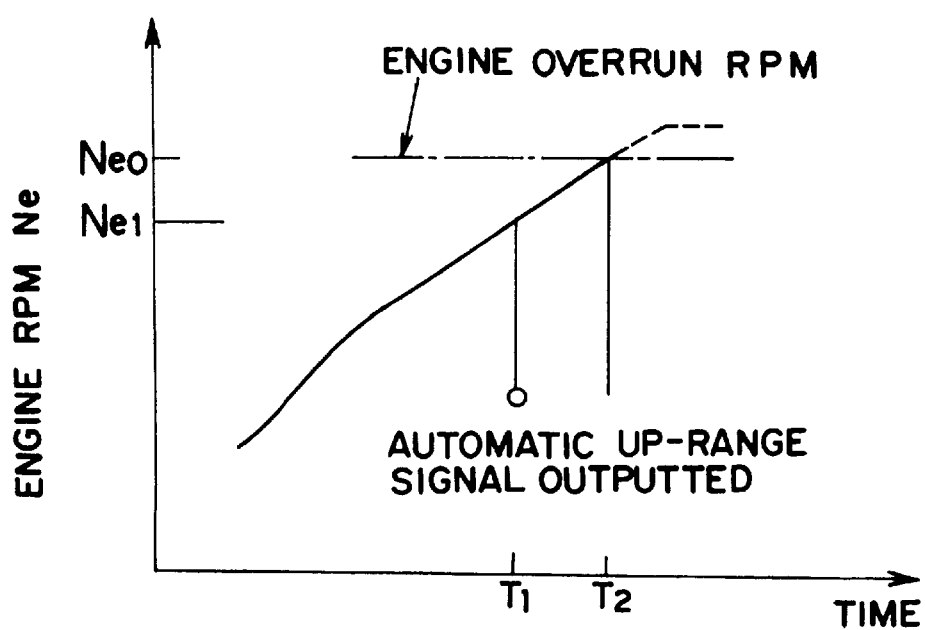
FIG. 13 is a time chart illustrating a control timing for preventing the overrun of the engine.

Simultaneously with the aforementioned up-range, the signal for switching the shift range is canceled (at Step 36) for a predetermined time period. This operation of Step 36 corresponds to cancel means of the present invention. Since an unavoidable delay occurs when the shift range is to be electrically switched, the signal for switching the shift range by operating the second shift lever 61 or the cut-off switch 62 or the cut switch 63 of push button type is inactivated for a time period till the switching control terminates, i.e., from an instant T1 to an instant T2, as shown in FIG. 13. By this control of Step 36, the shift ranges are not continuously switched by two steps so that the physical disorder or uncomfort can be avoided. Moreover, the down-range and the downshift to be caused by the former can be avoided to prevent the overrun of the engine 1.

The control of Step 36 is continued till the end is decided (at Step 37). At this decision, the end of the up-range control is decided in terms of the engine RPM Ne and by the timer.

On the other hand, when the answer of Step 34 is NO because the engine RPM Ne is lower than the reference value Ne1, the ESR mode is continued (at Step 38). In other words, the prevailing shift range, as electrically set, is continued as it is.

This control of FIG. 12 can be applied to not only the automatic transmission, in which the shift ranges are set by the electric control, but also the automatic transmission in which the gear stages are set by the electric control, because it changes the gear stages by the electric control. Specifically, there has been called the "sport mode" and well known in the art the shift control, in which an upshift switch and a downshift switch or a gear stage switch are provided and turned ON by the shift lever so that the gear stages may be set on the basis of the output signals of those switches. In the sport mode of this kind, the individual gear stages are basically set by the electric signals based on the manual operations. When the release condition such as the overrun of the engine is satisfied, however, the shift is executed not depending upon the electric signals based on the manual operations.

If the aforementioned control of Step 36 of FIG. 12 is executed even in the case of the shift satisfying the release condition, it is possible to prevent the two-step upshift or downshift. For this control, it is sufficient to change the operation of Step 33 of FIG. 12 to a step of deciding whether or not the sport mode is selected, and the operation of Step 36 to a step of canceling the shift signal.

Although the present invention has been described on the basis of its specific embodiments, it can be practiced in an automatic transmission which is equipped with a gear train or a hydraulic circuit other than the gear train shown in FIG. 15 and the hydraulic circuit shown in FIG. 17.

Here will be synthetically described the advantages to be obtained from the present invention. As has been described according to the present invention, a shift range for effecting the engine braking is selected more easily by operating the second range switching mechanism than by operating the hold mechanism to allow the action of the first range switching mechanism, so that the use of the second range switching mechanism is promoted for the switching to the shift range effecting the engine braking. In other words, the frequency for the driver to bring his hand to the first range switching mechanism for switching the shift range mechanically is reduced to improve the conveniences for the shift range switching operations.

According to the present invention, on the other hand, the operation to return the shift range from a specific one such as the drive range capable of setting all the forward gear stages to the shift range, as set lower by two or more steps than the former by the second range switching mechanism, can be performed by the single operation of the return switch thereby to improve the conveniences of the operation for switching the shift ranges.

According to the present invention, moreover, the individual levers for switching the shift ranges are arranged near the steering wheel, so that the shift ranges can be switched without bringing the driver's hand far from the steering wheel. Since any of the forward ranges is selected by operating the second shift lever, the first shift lever need not be provided with the shift positions corresponding to all the shift ranges, so that the first shift lever can be reduced in its shift positions to prevent its physical or visual interference with the peripheral equipments.

According to the present invention, even if the shift range selected by the first range switching mechanism and the shift range selected by the second range switching mechanism are different, the shift range to be set is that which is selected by the first range switching mechanism so that it reflects more correctly upon the intention of the driver. Thus, it is possible to prevent the discrepancy between the intention of the driver and the actually set shift range.

According to the present invention, furthermore, the shift range can be switched to one lower by two or more steps by the single operation of the switch thereby to improve the operability.

According to the present invention, furthermore, as the shift range is switched to a higher-speed one, the gear stage is also switched to a higher-speed one having a smaller gear ratio so that the RPM of the prime mover can be lowered to prevent the overrun of the same in advance. During the control for switching the shift range to a higher-speed one so as to prevent the overrun of the prime mover, on the other hand, the signal from the second range switching mechanism to be operated at will can be canceled, even if outputted, to prevent any overlap controls.

What is claimed is:

1. A shift range control system for an automatic transmission which has:

a shift device for selecting any of a plurality of shift ranges, including shift ranges for forward runs, by operating a shift lever manually; and a range switching mechanism operative independent of the shift device to output an electric signal for switching said shift ranges for forward runs electrically; and an electrical range switching mechanism enabling switch which is mounted on said shift device and is turned ON to enable said range switching mechanism to a state in which the electric signal can be outputted.

2. A shift range control system for an automatic transmission according to claim 1, wherein a number of gear stages differs sequentially in the shift ranges for forward runs, and wherein said range switching mechanism includes a mechanism for switching said shift ranges for forward runs sequentially as said range switching mechanism outputs the electric signal while said enabling switch is turned ON.

3. A shift range control system for an automatic transmission according to claim 1, wherein the range switching mechanism includes a second shift lever attached to a steering column and switches for being operated by the second shift lever and outputting the electric signal.

4. A shift range control system for an automatic transmission according to claim 1, wherein the range switching mechanism includes push button switches mounted on a steering wheel, which is operated by a finger of a hand and output electrical signals.

5. A shift range control system for an automatic transmission according to claim 4, wherein one of the push button switches is attached to a front of the steering wheel and other push button switch is attached to a back of the steering wheel.

6. A shift range control system for an automatic transmission according to claim 5, wherein one of the push button switches attached to a front of the steering wheel outputs the signal for downshifting the shift range and other push button switch attached to a back of the steering wheel outputs the signal for upshifting the shift range.

* * * * *